United States Patent [19]

Lenker et al.

[11] 4,136,509
[45] Jan. 30, 1979

[54] APPARATUS FOR HARVESTING VEGETABLE HEADS

[75] Inventors: Don H. Lenker; Dennis F. Nascimento; Paul A. Adrian, all of Salinas, Calif.

[73] Assignee: The United States of America as represented by the Secretary of Agriculture, Washington, D.C.

[21] Appl. No.: 789,377

[22] Filed: Apr. 20, 1977

[51] Int. Cl.² ............................................. A01D 45/26
[52] U.S. Cl. .................................. 56/327 R; 56/10.2; 171/61
[58] Field of Search .................... 56/10.2, 10.5, 327, 56/DIG. 15; 171/38, 61; 47/1.7

[56] References Cited

U.S. PATENT DOCUMENTS

| | | | |
|---|---|---|---|
| 2,625,781 | 1/1953 | Tateyama | 171/38 |
| 2,855,058 | 10/1958 | Krier et al. | 171/38 |
| 3,300,955 | 1/1967 | Barnes | 56/327 R |
| 3,650,097 | 3/1972 | Nokes | 56/10.2 |
| 3,690,049 | 9/1972 | Roberson | 56/327 R |
| 3,731,477 | 5/1973 | Coon | 56/327 R |
| 3,797,208 | 3/1974 | Strubbe | 56/10.2 |
| 3,800,518 | 4/1974 | Baggiolini et al. | 56/327 R |
| 3,821,987 | 7/1974 | Shepardson et al. | 56/327 R |
| 3,827,503 | 8/1974 | Hansen | 56/327 R |
| 3,991,618 | 11/1976 | Stampter et al. | 56/DIG. 15 |

*Primary Examiner*—Russell R. Kinsey
*Assistant Examiner*—Paul J. Hirsch
*Attorney, Agent, or Firm*—M. Howard Silverstein; David G. McConnell; Theodore J. Leitereg

[57] ABSTRACT

Apparatus for harvesting vegetable heads is disclosed. A sensing means including a pair of parallel, laterally movable, head-engaging units, which are counter-rotated, is fixed to a frame. A cutting means is mounted on the frame and is responsive to the sensing means. The cutting means includes a horizontal knife blade rotatable 180° for each head cut. The severed head is removed from the cutting area by a pair of counter-rotating lifter belts.

2 Claims, 8 Drawing Figures

APPARATUS FOR HARVESTING VEGETABLE HEADS

BACKGROUND OF THE INVENTION

1. Field of the Invention

This invention relates to and has among its objects the provision of novel apparatus for harvesting vegetable heads which are non-colinear with respect to the stalk line in a row of heads. Further objects of the invention will be evident from the following description wherein parts and percentages are by weight unless otherwise specified.

2. Description of the Prior Art

Vegetable heads, such as cauliflower or cabbage, grown in the United States are presently harvested manually. The harvesters select the head to be harvested by visual observation according to size. The head is then manually cut and thrown into a suitable receptacle, e.g., a trailer drawn by a tractor.

Manual harvesting is fraught with disadvantages such as large consumption of time and expense, inevitable spoilage of mature vegetable heads, etc. For example, during peak growth periods a sufficient number of workers cannot be obtained to pick a cauliflower crop. As a result, the cauliflower heads, which can become over-mature one-day after they are ready for harvest, are lost as a salable product.

Mechanical means for harvesting lettuce heads are known and described in U.S. Pat. Nos. 3,300,954, and 3,300,955. In the known apparatus the maturity of the head is determined by compression rollers, one fixed and the other laterally movable. The compression rollers are composed of a plurality of cylindrical rollers mounted on shafts and projected downwardly. The compression rollers form a V-shaped configuration. A mature lettuce head will laterally displace the movable compression roller thus triggering a cutting mechanism which cuts the mature lettuce head. The cutting mechanism includes a pair of knife baskets vertically rotatable. Each knife basket is equipped with a knife and a basket or cradle portion. The knife severs the lettuce head and the cradle portion conveys the harvested head to a container.

Although the known harvester works well for harvesting lettuce heads, it cannot be used for harvesting vegetable heads such as cauliflower and cabbage. A mature head of cauliflower, for example, is composed of a center or head of cauliflower engulfed in an abundance of large, loose-fitting leafy material. Thus, the cauliflower head is quite different from a lettuce head which is composed of leaves of lettuce tightly formed into a ball-like shape. Cauliflower and cabbage plants also have longer stems and grow further out of line from the row in which they are planted than do lettuce plants. That is to say certain of the heads ar non-colinear with the stalk line in a particular row. Generally, the stalks of the plant remain in a straight line corresponding to that formed when the seeds are planted. The plants, themselves, however, grow out of this stalk line, i.e., they are non-colinear therewith. Lettuce heads, on the other hand, will grow colinearly within the row.

The leaves surrounding the cauliflower and cabbage heads cause the known harvester to function improperly by fouling the compression rollers. In addition, the known selector cannot align itself with non-colinearly growing vegetable plants because one compression roller is fixed. Furthermore, the cutting mechanism is not adequate to sever mature heads of cauliflower or cabbage with their bulky leaf package.

SUMMARY OF THE INVENTION

The invention described herein provides means and apparatus for avoiding the above problems. The apparatus of the invention allows the mechanical harvesting of mature vegetable heads which are non-colinear with the stalk line leaving the immature heads to further develop.

In the apparatus of the invention a sensing means is fixed to a frame. The sensing means includes a pair of parallel, laterally movable, counter-rotating head-engaging units. The head-engaging units are equipped with a mutual tension and electrical mechanism which is reactive to a mature vegetable head. The head-engaging units can move to either side to align themselves with the non-colinear vegetable heads while retaining their parallel relationship to one another. A cutting means responsive to the sensing means is also mounted on the frame and includes a horizontal knife blade, rotatable 180° for each head cut. Two inclined lifter belts collect the selected and cut heads, which are then removed from the field.

An advantage of the invention is that mature vegetable heads can be harvested rapidly and efficiently while at the same time the immature heads can be left in place to develop into mature heads. As a result, the fully-grown heads are harvested at the proper time so that spoilage does not occur.

The primary advantage of the invention is that non-colinear vegetable heads can be harvested mechanically. Heretofor, such harvesting was accomplished only by hand.

BRIEF DESCRIPTION OF THE DRAWINGS

FIGS. 4, 5, 6, and 7 are top plan views of the sensing mechanism of the apparatus of the invention.

FIG. 8 is a perspective view of a section of a lifter belt depicted in FIGS. 1, 2, and 3, with the belt removed.

DESCRIPTION OF THE PREFERRED EMBODIMENTS

Figure 1:
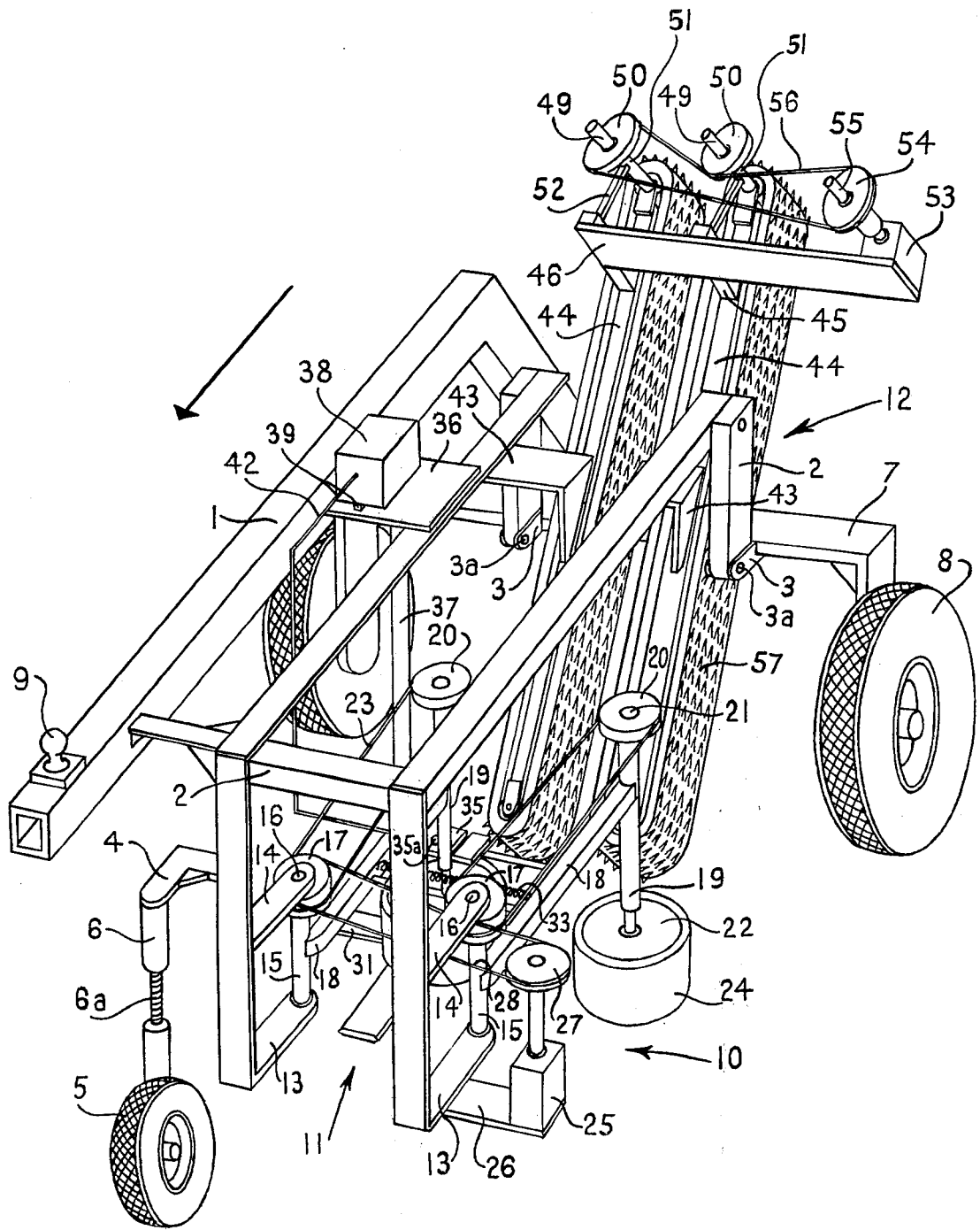
FIG. 1 is a perspective view of the cauliflower harvester of the invention taken at an angle from the front.

Referring to FIG. 1, pivotally attached to frame 1 is subframe 2 by means of members 3 which pivot at points 3a. Support member 4 is fixedly attached to 2 and projecting downwardly from 4 is shaft 6 on which wheel 5 is rotatably attached. Shaft 6 is adjustable at point 6a, which can take the form of a screw means or the like, so that a height suitable for proper cutting of the vegetable heads in a particular field can be obtained. Attached to one end of frame 1 is axle 7 on the ends of which wheels 8 are rotatably mounted. Located at the other end of frame 1 is hitch 9 or other means for attaching the apparatus of the invention to a tractor.

Although the cauliflower harvester is shown as containing its own means for mobilization, this is not meant to indicate that it cannot be used otherwise. The apparatus of the invention as depicted in FIG. 1 can be attached to a tractor or other vehicle to provide motorization. Furthermore, the essential features of the apparatus may be incorporated into a device which is self-contained, i.e., contains its own sources for power and mobility. Other embodiments of the apparatus of the invention will be suggested to those skilled in the art. It is also within the compass of the invention to use several of the apparatus of the invention in a multi-unit system for harvesting several rows of vegetable heads at one time.

The apparatus as depicted in FIG. 1 includes subframe 2 to which are attached sensing means 10, cutting means 11, and lifting means 12 (10, 11, and 12 being described in detail hereinbelow).

Fixedly attached to 2 are support members 13 and 14 which are connected by downward-projecting bearing housing 15. Inside 15 are shafts 16 fixedly attached to 13 and 14. Double pulleys 17 are rotatably mounted on shafts 16 just below upper support member 14. Fixedly attached to 15 are a pair of parallel, rearward-projecting arms 18 at the other end of which are attached downward-projecting bearing housings 19. Arms 18 and housings 15 pivot on shaft 16. Inner shafts 21 are secured to pulleys 20 and rollers 22 such that the rotation of 20 caused by belts 23 further causes rollers 22 to rotate. The outer perimeter 24 (about 2–3 cm. thick) of 22 is formed of pliable material such as neoprene foam or the like. Generally, rollers 22 are about 30–40 cm. in diameter. Hydraulic motor 25 is mounted on plate 26 which in turn is attached to subframe 2. Pulley 27 is rotatably mounted on 25 and belt 28 connects pulleys 27 and 17 such that the rotation of pulley 27 causes pulleys 17 to counter-rotate.

Figure 2:
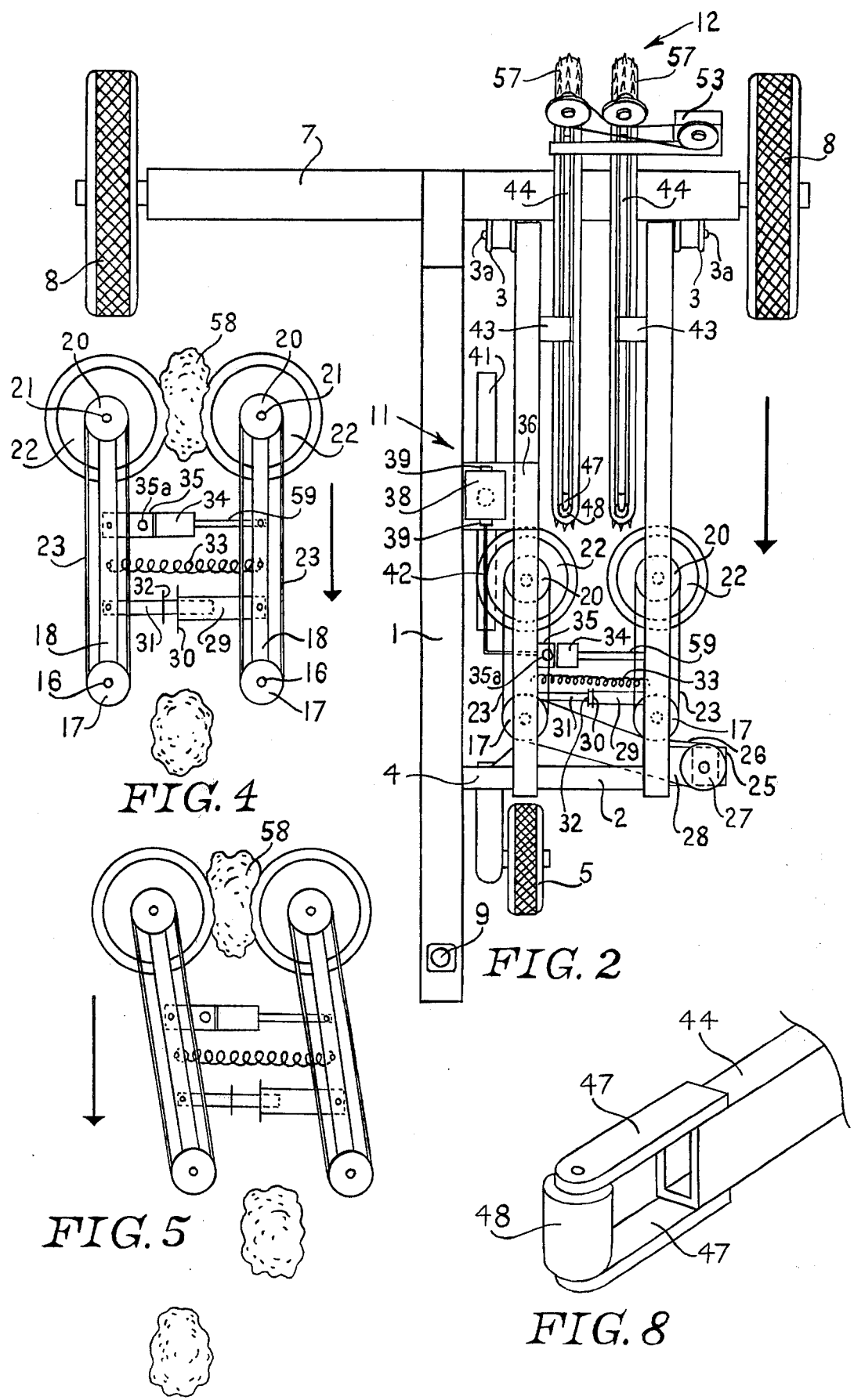
FIG. 2 is a top plan view of the same apparatus.

For the remaining features of sensing mechanism 10 attention is directed specifically to FIG. 2. Pivotally mounted on one of arms 18 is guide 29 with stop 30. On other arm 18, also pivotally mounted, is plunger guide 31 equipped with stop 32. It is to be noted that 31 extends into 29. Further pivotally attached to arms 18 is tension spring 33, selector potentiometer 34, and reference potentiometer 35. Reference potentiometer 35 has dial 35a for adjusting the reference signal.

Figure 3:
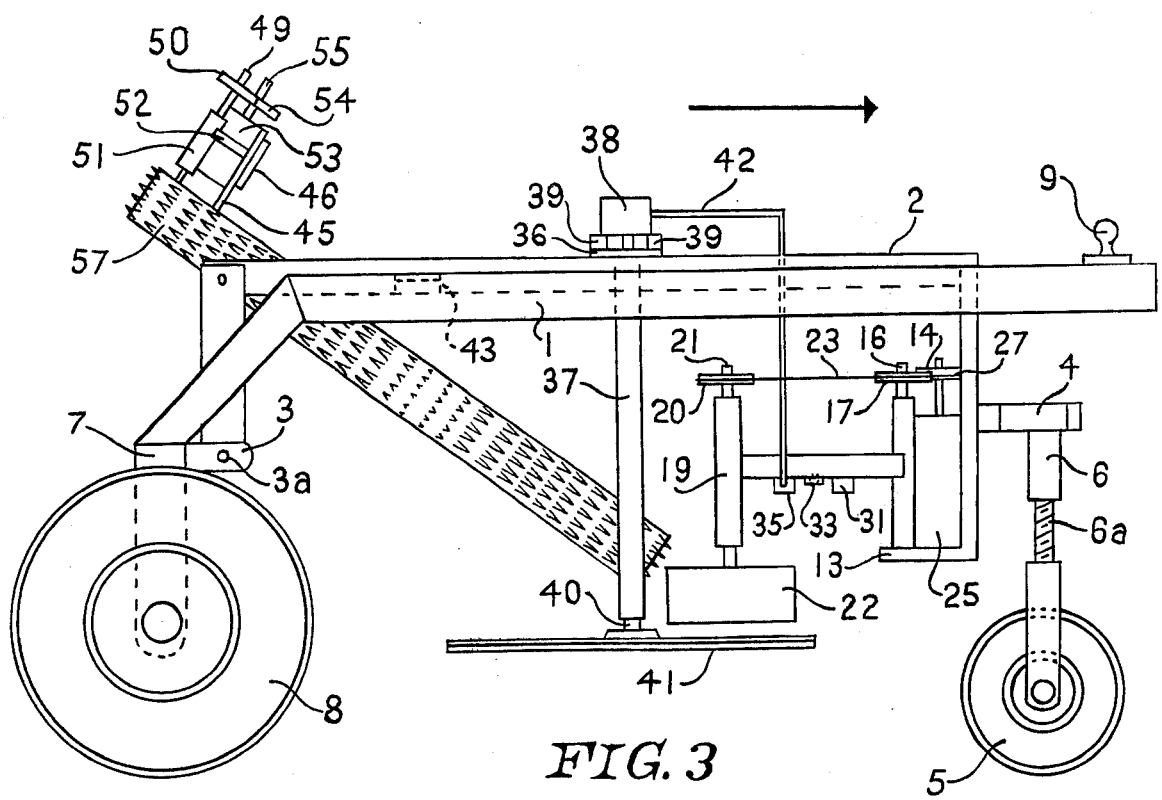
FIG. 3 is a side view of the apparatus of the invention.

Referring now to FIG. 3, plate 36 is mounted on 2 and downward directing bearing housing 37 is fixed thereto. Hydraulic motor 38 is attached to 36 by means of support member 39 and rotating shaft 40 is attached at one end to 38 and at its other end to knife blade 41. Wire 42 forms an electronic link between motor 38 and potentiometers 34 and 35.

Referring again to FIG. 1 support members 43 are fixedly attached to 2 and to lifter belt support members 44. Also attached to 44 are support members 45 to which plate 46 is afixed.

It is to be observed in FIG. 8 that lifter belt support members 44 are attached at each end to plates 47. Rollers 48 are rotatably mounted between plates 47.

In FIG. 1 inner shafts 49 are shown as fixedly attached to rollers 48 at one end and to pulleys 50 at the other. Inner shaft 49 is rotatable within bearing housing 51 which is fixedly connected to support members 52. Support members 52 are fixedly connected to plate 46. Mounted on plate 46 is hydraulic motor 53 with pulley 54 rotatably mounted thereon by means of shaft 55. Belt 56 connects pulleys 50 and 54. Rotation of pulley 54 causes pulleys 50 to counter-rotate. Belts 57 are formed from compressible, flexible material, such as a rubber belt with finger-like projections, which will grip the cauliflower leaves containing the head. Preferably, the angle of inclination of belts 57 is about 45° from the horizontal. The lifter belt mechanism is constructed to lift only the severed heads leaving unsevered immature heads intact.

The operation of the harvester of the invention is next described with reference to the accompanying drawings. Cauliflower heads are emphasized below solely by way of illustration and not limitation.

The harvester travels in a direction such that the cauliflower heads first encounter rollers 22. Motor 25 rotates rollers 22 at a speed of about 1 to 1.5 times that of the ground speed of the harvester, the latter speed being determined by the nature of the cauliflower field. Rollers 22 are counter-rotated in a direction which allows the cauliflower heads to be drawn through the rollers. The rotation of 22 provides several advantages. The leafy portion of the cauliflower heads is compacted against the head itself, thus facilitating the sensing of the head's maturity. Further, the rotation of 22 causes the rollers to move laterally, if necessary, to engage a non-colinear head in a row of cauliflower heads which are linear with respect to their stalks. Finally, the cut cauliflower head is passed to lifter belts 57 by the rotation of 22.

The action of sensing means 10 is next explained with reference particularly to FIGS. 4–7. FIG. 4 depicts rollers 22 encountering cauliflower head 58 substantially in line with the row of cauliflower heads. At their rest position rollers 22 are maintained apart by stops 30 and 32. Otherwise, tension spring 33 would cause the rollers to come together completely. When a head is encountered rollers 22 engage it and draw it inward. As the head moves through the rollers, it pushes the rollers laterally away from each other. This lateral movement is resisted by spring 33. The lateral movement of 22 causes rod 59 to withdraw from selector potentiometer 34. The signal from reference potentiometer 35 is fixed by means of dial 35a at a level in between that which a mature and that which an immature head would induce in 34. Head 58 passes through 22 without generating a signal in 34 that exceeds the reference signal and, consequently, cutting means 11 is not activated.

FIG. 5 depicts a similar situation; however, in this instance the cauliflower head is non-colinear with the stalk line. It is to be observed that rollers 22 again engage the head forcing the sensing mechanism to move sideward. The geometry of the selector is such that the arms 18 are maintained approximately parallel to each other. This feature of the present apparatus allows accurate measurement of the head size even though the sensing mechanism, including the rollers, has moved laterally in the process of engaging the cauliflower head.

Figure 6:
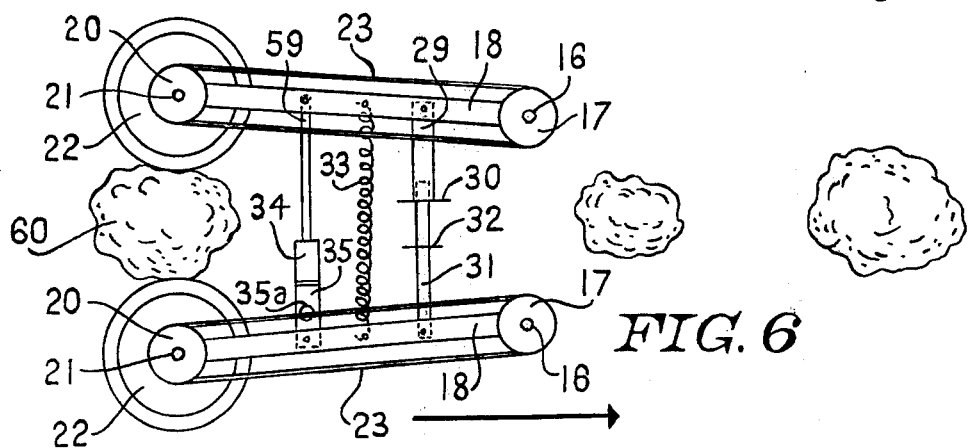

It is to be observed in FIG. 6 that mature cauliflower head 60 will force 22 to move laterally apart. Rod 59 withdraws from 34 for a distance sufficient to create a signal in 34 which exceeds the signal in reference 35. The signal is then relayed by means of 42 to motor 38, which in turn rotates blades 41 a half revolution or 180°. The knife is driven at a speed proportional to the ground speed of the apparatus. Generally, where the cauliflower heads are planted about 25 cm. apart, the knife blade will rotate at a speed such that the harvester travels forward about 12 cm. while the knife blade revolves 180°. The controlled speed of the knife blade insures that only the selected head will be severed.

The cut head is passed to lifter belts 57 and conveyed thereby to a suitable collecting device. Belts 57 are driven by motor 53 at a speed adjusted to efficiently remove the harvested heads from the cutting area. The belts are counter-rotated in the same direction as rollers 22.

Figure 7:
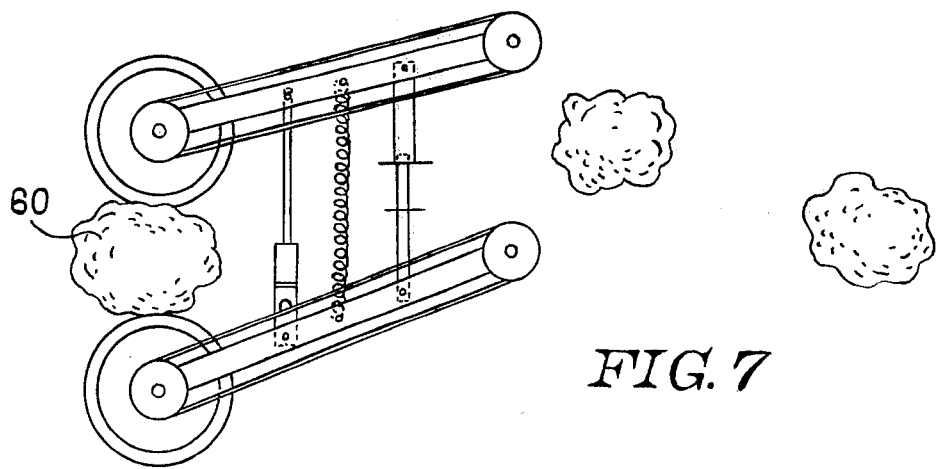

In a similar manner a mature head which is non-colinear with the stalk line is harvested as depicted in FIG. 7. The mature head is engaged even though it is not colinear. Again, arms 18 are maintained in an approximately parallel configuration. Rollers 22 move laterally apart causing the signal from 34 to exceed 35, thus triggering the cutting means. It is to be noted that the harvester continues to move in a straight line; only the elements depicted in FIGS. 4–7 move in a parallel fashion. It is to be noted also that these elements will align themselves with the remainder of the apparatus after contact with the non-colinear head.

It is within the compass of the invention to mount reference potentiometer 35 in a position other than adjacent to 34. Thus, for example, 35 may be mounted near the operator of the present apparatus so that the reference signal can be changed with dial 35a without stopping the apparatus of the invention. It should be remembered, however, that 35 must be electronically linked both to motor 38 and to selector potentiometer 34.

Having thus described our invention, we claim:

1. An apparatus for harvesting non-colinear vegetable heads, which comprises -
   (a) a frame,
   (b) sensing means mounted on said frame, laterally movable to engage the non-colinear vegetable heads, for distinguishing mature heads by size in a row of heads to be harvested, said means including
   a head-engaging unit comprising a pair of parallel pivotable arms with counter-rotating rollers about 30–40 centimeters in diameter with an outer perimeter of pliable material about 2–3 centimeters thick mounted to move laterally away from each other, said movement being resisted by a mutual tension means,
   guide means for maintaining said arms parallel, and
   an electrical mechanism including a selector potentiometer cooperative with said head-engaging unit and a reference potentiometer cooperative with said head-engaging unit and said selector potentiometer for distinguishing mature heads by size in a row of heads to be harvested,
   (c) means mounted on said frame responsive to said sensing means for cutting the mature heads including a horizontal knife blade rotatable 180° for each head cut, and
   (d) means for lifting cut heads from the cutting area including a pair of counter-rotated lifting belts, said means leaving uncut heads intact.

2. The apparatus of claim 1 wherein the rollers are counter-rotated at a speed of about 1 to 1.5 times the ground speed of the apparatus.

* * * * *